United States Patent
Bienvenu

(10) Patent No.: US 9,218,009 B2
(45) Date of Patent: Dec. 22, 2015

(54) POWER SUPPLY OF A LOAD AT A FLOATING-POTENTIAL

(71) Applicant: STMicroelectronics (Rousset) SAS, Rousset (FR)

(72) Inventor: Philippe Bienvenu, Saint Maximin la Sainte Baume (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 148 days.

(21) Appl. No.: 13/960,224

(22) Filed: Aug. 6, 2013

(65) Prior Publication Data

US 2014/0055119 A1  Feb. 27, 2014

(51) Int. Cl.
| | | |
|---|---|---|
| G05F 3/18 | (2006.01) | |
| G05F 1/10 | (2006.01) | |
| G05F 3/26 | (2006.01) | |
| H02M 3/07 | (2006.01) | |

(52) U.S. Cl.
CPC .. G05F 1/10 (2013.01); G05F 3/18 (2013.01); G05F 3/262 (2013.01); H02M 3/07 (2013.01)

(58) Field of Classification Search
CPC ....... H02M 3/07; H02M 3/073; H02M 3/158; H02M 7/10; H02M 7/19; H02M 7/25; G05F 3/02; G05F 3/08; G05F 3/18

USPC .............. 363/59, 60; 307/109, 110; 327/536; 323/231, 271, 282; 361/18, 87

See application file for complete search history.

(56) References Cited

U.S. PATENT DOCUMENTS

| | | | | |
|---|---|---|---|---|
| 5,585,991 | A | * | 12/1996 | Williams ........................ 361/30 |
| 5,642,072 | A | * | 6/1997 | Miyamoto et al. ............ 327/535 |
| 5,689,208 | A | | 11/1997 | Nadd |
| 6,501,254 | B2 | | 12/2002 | Spalding, Jr. |
| 6,917,187 | B2 | * | 7/2005 | Okubo et al. ................. 323/275 |
| 7,038,430 | B2 | * | 5/2006 | Itabashi et al. ............... 323/224 |
| 7,462,995 | B2 | | 12/2008 | Hamidian et al. |
| 2008/0143309 | A1 | | 6/2008 | Odell et al. |
| 2011/0043140 | A1 | * | 2/2011 | Shiu ............................. 315/307 |
| 2011/0057633 | A1 | | 3/2011 | Tanabe |
| 2014/0055119 | A1 | | 2/2014 | Bienvenu |

FOREIGN PATENT DOCUMENTS

| | | |
|---|---|---|
| CN | 203444383 U | 2/2014 |
| WO | WO 2006/023145 A2 | 3/2006 |

* cited by examiner

*Primary Examiner* — Gary L Laxton
(74) *Attorney, Agent, or Firm* — Slater & Matsil, L.L.P.

(57) ABSTRACT

A circuit includes a current source intended to be series-connected with a load between two terminals of application of a first D.C. voltage. An element limits the voltage across the load and a circuit controls the value of the current in the current source with the current flowing in the element.

26 Claims, 2 Drawing Sheets

POWER SUPPLY OF A LOAD AT A FLOATING-POTENTIAL

This application claims priority to French Patent Application No. 1257951, which was filed Aug. 23, 2012 and is incorporated herein by reference.

TECHNICAL FIELD

The present disclosure relates to electronic circuits and, in specific embodiments, to circuits for powering a load from a D.C. voltage capable of varying.

BACKGROUND

When a load is to be powered under a fixed D.C. voltage, a voltage-setting element, typically a zener diode connected in parallel with the load, is often used. A current source is then series-connected with this parallel association and the assembly is powered with a D.C. voltage. The zener diode has the function of limiting (setting) the voltage across the load. The current source has the function of absorbing the current flowing through the load and through the zener diode.

For a fixed load (constant power consumption), the current source is sized according to this current to guarantee that the zener diode is permanently in avalanche (active as a voltage limiter).

However, for a load having a power consumption which is capable of varying, the current source must then be sized according to the maximum power consumption of the load. This generates an unnecessary power consumption when the load does not draw this maximum current.

SUMMARY OF THE INVENTION

An embodiment overcomes all or part of the disadvantages of usual circuits for powering a load.

Another embodiment optimizes the power consumption of the power supply circuit and, more specifically to decrease its losses.

An embodiment provides a solution requiring no modification of the load to be powered.

Thus, an embodiment provides a circuit includes a current source intended to be series-connected with a load between two terminals of application of a first D.C. voltage. An element limits the voltage across the load. A circuit controls the value of the current in the current source with the current flowing in the element.

According to an embodiment, the control circuit comprises a first MOS transistor, assembled as a diode and as a current mirror on a second MOS transistor. The second transistor is in series with a third transistor between the terminals of application of the power supply voltage. The third transistor is assembled as a diode and as a current minor on a fourth transistor connected to a control terminal of the current source.

According to an embodiment, the element is a zener diode connected to the junction point of the load and of the current source.

According to an embodiment, the zener diode is in series with the first transistor.

According to an embodiment, the element is internal to the load and controls the first transistor.

According to an embodiment, the fourth transistor is in series with a resistive element between two terminals of application of a second D.C. voltage.

According to an embodiment, the current source is formed of a MOS transistor.

According to an embodiment, the load is a charge pump circuit.

The foregoing and other features and advantages will be discussed in detail in the following non-limiting description of specific embodiments in connection with the accompanying drawings.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
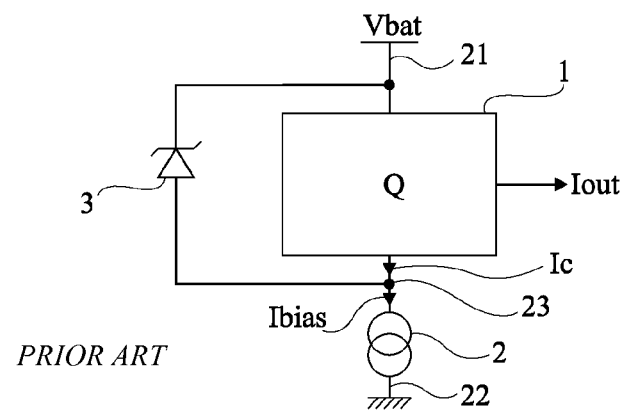
FIG. 1 schematically shows a usual example of a circuit for powering a load.

The same elements have been designated with the same reference numerals in the different drawings. For clarity, only those elements which are useful to the understanding of the described embodiments have been shown and will be detailed. In particular, such embodiments are compatible with any type of load intended to be in series with a current source.

An example of application of the embodiments which will be described aims at a load formed of a charge pump or charge transfer circuit. In such a circuit, the power consumption varies according to that of the element(s) powered by the charge pump.

Similar problems more generally arise as soon as a load is to be powered from a voltage capable of varying and as its power supply voltage is desired to be set by means of a zener diode or the like. Actually, the load then is in series with a current source, which creates a node at a floating potential. For example, this may be amplification or comparison circuits referenced to a potential other than ground.

FIG. 1 shows a usual example of a circuit for powering a load 1 (Q) with a D.C. voltage (for example, a voltage Vbat delivered by a battery) and having a variable power consumption. The circuit to be powered (i.e., load 1) is series-connected with a constant current source 2 between two terminals 21 and 22 of connection to the source (battery) providing the D.C. voltage. A zener diode 3 or the like is connected in parallel with load 1. The zener diode 3 has an anode on the side of junction point 23 of the load and of current source 2.

The operating principle is the following. The current source is usually sized to sample a constant current Ibias to ensure an operation of the load according to its different power consumptions. In the example of FIG. 1, this consumption depends on current Iout, which may be provided by load 1. Current Ibias is selected to be greater than the maximum value of current Ic capable of being drawn by load 1, to ensure a proper biasing of zener diode 3. In the opposite case, zener diode 3 blocks and the power supply voltage across load 1, set by the threshold voltage of the zener diode, drops.

Such a circuit is more specifically intended for applications in which D.C. voltage Vbat risks varying and where the load must be powered with an approximately constant voltage.

This justifies the use of a zener diode 3 or another component for setting a voltage threshold.

A problem with a circuit of the type in FIG. 1 is that the general power consumption is independent from the power consumption of load 1. Indeed, constant current source 2 must be sized with respect to the worst case of load power consumption. This results in a maximum permanent power consumption, even when the load does not need it, the excess current being then deviated by the zener diode.

Figure 2:
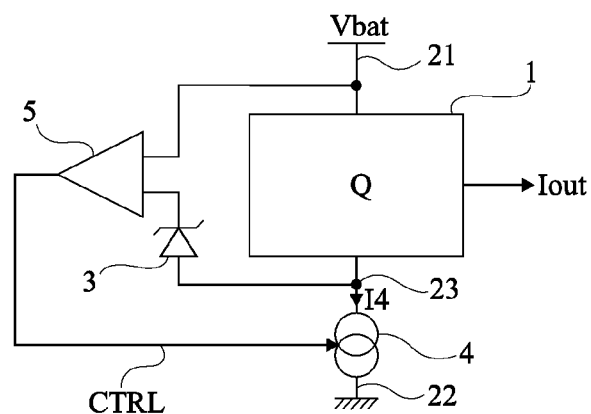
FIG. 2 is a functional block diagram of an embodiment of a circuit for powering a load.

FIG. 2 is a functional diagram of an embodiment of a circuit for powering a load 1. As previously, load 1 is series-connected with a current source 4 between two terminals 21 and 22 of application of a D.C. voltage Vbat. However, current source 4 here is an adjustable current source. The value of current 14 in current source 4 depends on a control signal CTRL provided by a circuit 5, which compares the voltage at node 21 with the voltage at node 23 plus the threshold voltage of zener diode 3. In other words, comparator 5 detects a variation of the voltage across load 1 with respect to the voltage set by diode 3.

The aim is to adjust the value of the current drawn by current source 4 to the load power consumption.

It could have been devised to use a measurement of current Tout provided by the load, or a direct measurement of the current in load 1 to assess its power consumption and adjust the value of the currents source. However, this would require modifying the actual load circuit. Further, sampling data from the current consumed by the load at the load level may influence its behavior.

Thus, as illustrated in FIG. 2, it is provided to control the current in current source 4 with the current flowing through zener diode 3. Indeed, if the load power consumption decreases, the current in the branch of the zener diode tends to increase, and conversely.

Figure 3:
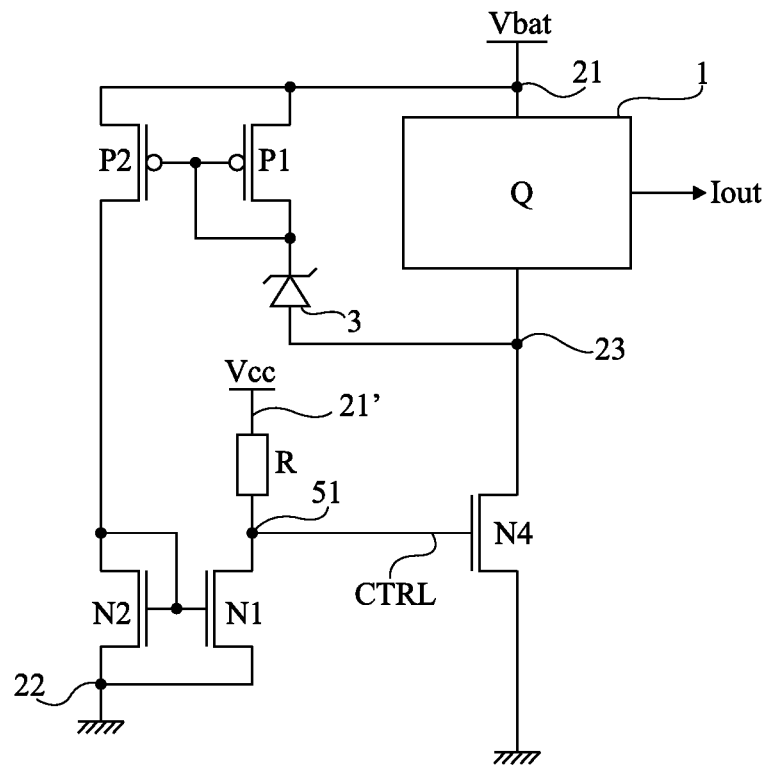
FIG. 3 shows the electric diagram of an embodiment of a circuit for powering a load at floating potential.

FIG. 3 shows an electric diagram of an embodiment of a power circuit such as shown in FIG. 2.

A MOS transistor P1, here with a P channel, assembled as a diode, is interposed between the cathode of zener diode 3 and terminal 21. Transistor P1 is assembled as a current minor on a P-channel MOS transistor P2 series-connected with an N-channel MOS transistor N2 between terminals 21 and 22. Transistor N2 is assembled as a diode and as a mirror on an N-channel MOS transistor N1. Transistor N1 is in series with a current-to-voltage conversion resistive element R between a terminal 21' of application of a D.C. voltage (Vcc) and ground 22. Voltage Vcc applied to terminal 21' is not necessarily identical to the voltage applied to terminal 21. In practice, it generally is a lower voltage. Junction point 51 of resistor R and transistor N1 is connected to the gate of an N-channel MOS transistor N4 forming current source 4.

Assuming that the load power consumption increases, the current in transistor P1, and thus in zener diode 3, tends to decrease. The current decrease, reproduced in transistor P2, and then in transistor N1 (current mirror N1, N2), functionally amounts to modifying the value of the resistive bridge formed of element R and of the on-state resistance of transistor N1. This results in an increase of the voltage at node 51, whereby the current drawn by transistor N4 increases.

Conversely, if the load power consumption decreases, the current increase in transistor P1 reflects on the current in transistor N1, which causes a decrease of voltage CTRL of the gate of transistor N4, whereby the current drawn by transistor N4 decreases.

In the sizing of the circuit of FIG. 3, the fact that the power supply voltage of load 1 is now set by the threshold voltage of the zener diode, plus the threshold voltage of diode-assembled transistor P1, will of course be taken into account.

An advantage of the discussed embodiment is that it optimizes the power consumption of current source 4 enabling to power load 1.

Another advantage is that the regulation requires no direct measurement of the load power consumption, or of output current Tout of this load. The implementation of the described embodiments thus requires no modification of load 1 to be powered.

As a specific embodiment, voltage Vbat is a voltage of a few tens of volts. Load 1 is a charge pump circuit intended to power application circuits. Voltage Vcc is on the order of a few volts.

Figure 4:
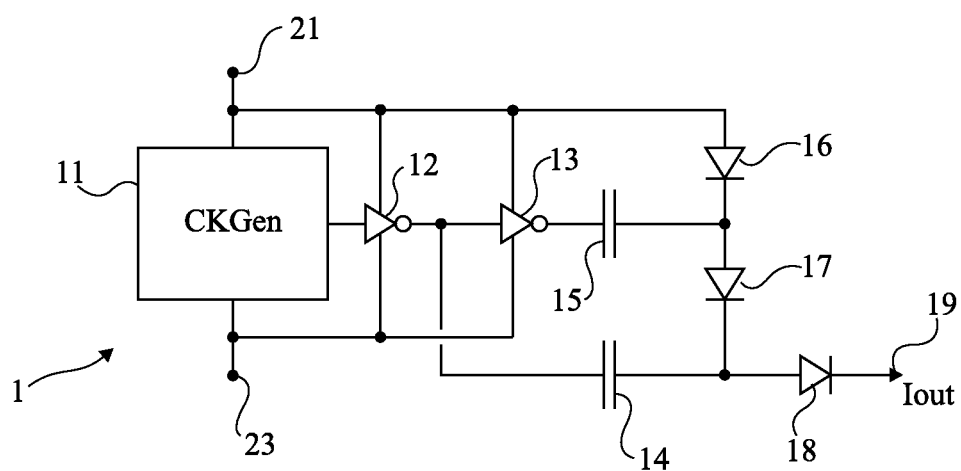
FIG. 4 shows an example of a load at a floating potential.

FIG. 4 illustrates an example of a charge pump circuit capable of forming load 1 of the circuit of FIGS. 2 and 3. Such a circuit is usual per se.

A clock generator 11 (CK Gen) is powered between terminals 21 and 23 and provides an input signal of a first inverter 12 in series with a second inverter 13. Inverters 12 and 13 are powered between terminals 21 and 23. The outputs of inverters 12 and 13 are each connected to a first electrode of a capacitive elements 14 and 15, respectively. Three diodes 16, 17, and 18 are series-connected between terminal 21 and a terminal 19 providing current Tout. Finally, the second respective electrodes of capacitors 14 and 15 are connected between diodes 16 and 17, respectively between diodes 17 and 18. The operation of such a circuit is known.

Various embodiments have been described. Various alterations, modifications, and improvements will occur to those skilled in the art. In particular, although the embodiments have been described in relation with a load 1 connected on the positive voltage side, the described circuit easily transposes to a load in series with a current source, the current source being on the positive voltage side. Further, although embodiments where the current limitation in the load is ensured by an external limiting element connected thereacross, a voltage reference (for example, internal to the load) may also be used to control the gate of transistor P1. Such a variation is particularly intended for the case where the load has such a voltage reference. Finally, the sizing of the circuit components is within the abilities of those skilled in the art based on the functional indications provided hereabove, on the maximum expected power consumption of the load, and by using electronic circuit sizing tools which are usual per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit comprising:
    a current source configured to be series-connected with a load between two terminals of application of a first D.C. voltage;
    an element configured to be coupled in parallel with the load between terminals of the load and to limit a voltage across the terminals of the load; and a control circuit configured to control a value of the current in the current source based on the current flowing in the element between the terminals of the load, wherein the value of the current in the current source is controlled proportional to power consumption in the load based on the current flowing in the element between the terminals of the load.

2. The circuit of claim 1, wherein the element comprises a zener diode connected to a junction point between the load and the current source.

3. The circuit of claim 2, wherein the element further comprises a first transistor connected in series with the zener diode, wherein the first transistor and the zener diode connected together in series are configured to be coupled in parallel with the load between terminals of the load.

4. The circuit of claim 1, wherein the current source is formed of a MOS transistor.

5. The circuit of claim 1, wherein the load comprises a charge pump circuit.

6. A circuit comprising:
a current source configured to be series-connected with a load between two terminals of application of a first D.C. voltage;
an element coupled to limit a voltage across the load; and
a control circuit configured to control a value of the current in the current source with the current flowing in the element, wherein the control circuit comprises a first MOS transistor assembled as a diode and as a current mirror on a second MOS transistor, the second MOS transistor being in series with a third transistor between the terminals of application of the first D.C. voltage and the third transistor being assembled as a diode and as a current mirror on a fourth transistor connected to a control terminal of the current source.

7. The circuit of claim 6, wherein the element comprises a zener diode connected to a junction point between the load and the current source.

8. The circuit of claim 7, wherein the zener diode is in series with the first MOS transistor.

9. The circuit of claim 6, wherein the element is internal to the load and controls the first MOS transistor.

10. The circuit of claim 6, wherein the fourth transistor is in series with a resistive element between two terminals of application of a second D.C. voltage.

11. A circuit comprising:
a first reference voltage terminal;
a second reference voltage terminal;
a load coupled between the first reference voltage terminal and the second reference voltage terminal;
a variable current source coupled in series with the load between the first reference voltage terminal and the second reference voltage terminal;
an element coupled in parallel with the load so as to limit a voltage across the load; and
a control circuit configured to control the variable current source to provide a current with a magnitude based on a current flowing through the element, wherein the control circuit is configured to control the variable current source to provide the current with the magnitude proportional to power consumption in the load based on the current flowing through the element.

12. The circuit of claim 11, wherein the first reference voltage terminal comprises a battery terminal and the second reference voltage terminal comprises a ground terminal.

13. The circuit of claim 11, wherein the element comprises a zener diode connected to a junction point between the load and the variable current source.

14. The circuit of claim 11, wherein the element is internal to the load.

15. The circuit of claim 11, wherein the variable current source comprises a transistor with a current path coupled in series with the load between the first reference voltage terminal and the second reference voltage terminal and a control terminal coupled to a control output of the control circuit.

16. The circuit of claim 13, wherein the element further comprises a first transistor connected in series with the zener diode, wherein the first transistor and the zener diode connected together in series are configured to be coupled in parallel with the load.

17. A circuit comprising:
a first reference voltage terminal;
a second reference voltage terminal;
a load coupled between the first reference voltage terminal and the second reference voltage terminal; and
a variable current source coupled in series with the load between the first reference voltage terminal and the second reference voltage terminal, the variable current source configured to provide a current with a magnitude that is a function of power being consumed by the load, wherein the variable current source comprises:
a transistor with a current path coupled in series with the load between the first reference voltage terminal and the second reference voltage terminal; and
a control circuit with a control output coupled to a control terminal of the transistor, wherein the control circuit comprises first, second, third and fourth MOS transistors, the first MOS transistor connected as a diode and as a current minor on the second MOS transistor, the second MOS transistor being in series with the third MOS transistor between the first and second reference voltage terminals and the third MOS transistor being connected as a diode and as a current minor on the fourth MOS transistor, which is coupled to the control terminal of the transistor.

18. The circuit of claim 17, further comprising a voltage limiting element coupled between the first MOS transistor and a junction point between the load and the variable current source.

19. The circuit of claim 18, wherein the voltage limiting element comprises a zener diode.

20. The circuit of claim 17, further comprising a resistive element coupled between the fourth MOS transistor and a D.C. voltage terminal.

21. The circuit of claim 20, wherein the first reference voltage terminal and the D.C. voltage terminal carry different voltages relative to the second reference voltage terminal.

22. The circuit of claim 11, wherein the variable current source is formed of a MOS transistor.

23. The circuit of claim 11, wherein the load comprises a charge pump circuit.

24. A circuit comprising:
a first reference voltage terminal;
a second reference voltage terminal;
an intermediate terminal;
a first P-channel transistor with current path coupled between the first reference voltage terminal and the intermediate terminal, the first P-channel transistor coupled as a diode;
a voltage limiting element coupled in series with the current path of the first P-channel transistor between the first reference voltage terminal and the intermediate terminal;
a second P-channel transistor with a current path coupled between the first reference voltage terminal and the second reference voltage terminal, the second P-channel transistor having a control terminal coupled to a control terminal of the first P-channel transistor;
a first N-channel transistor with a current path coupled in series with the current path of the second P-channel transistor between the first reference voltage terminal and the second reference voltage terminal, the first N-channel transistor being coupled as a diode;
a second N-channel transistor with a control terminal coupled to a control terminal of the first N-channel transistor, the second N-channel transistor having a current path coupled in series with a resistive element between the second reference voltage terminal and a third reference voltage terminal; and
a current source transistor with a current path coupled between the intermediate terminal and the second reference voltage terminal, the current source transistor having a control terminal coupled to the second N-channel transistor.

25. The circuit of claim 24, wherein the voltage limiting element comprises a zener diode.

26. The circuit of claim 24, further comprising a load coupled between the first reference voltage terminal and the intermediate terminal.

\* \* \* \* \*